United States Patent
Van Ruiten et al.

(10) Patent No.: US 6,911,257 B2
(45) Date of Patent: Jun. 28, 2005

(54) PROCESS FOR THE MANUFACTURE OF HOMOPOLYAMIDE-4,6 FIBERS

(75) Inventors: Jippe Van Ruiten, Munstergeleen (NL); Johan A. F. Kunst, Maastricht (NL); Rudy Rulkens, Cadier en Keer (NL); Jan P Penning, Maastricht (NL)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 10/483,066

(22) PCT Filed: Jul. 5, 2002

(86) PCT No.: PCT/NL02/00441
§ 371 (c)(1),
(2), (4) Date: Aug. 11, 2004

(87) PCT Pub. No.: WO03/006724
PCT Pub. Date: Jan. 23, 2003

(65) Prior Publication Data
US 2005/0017398 A1 Jan. 27, 2005

Related U.S. Application Data

(60) Provisional application No. 60/303,389, filed on Jul. 9, 2001.

(51) Int. Cl.$^7$ .................................................. D01F 6/00
(52) U.S. Cl. ..................... 428/364; 428/395; 264/176.1; 264/211.12; 264/210.7; 528/335
(58) Field of Search ......................... 264/176.1, 211.12, 264/210.7; 428/364, 395; 528/335

(56) References Cited

U.S. PATENT DOCUMENTS

| 2,130,948 | A | * | 9/1938 | Carothers | .................. 15/159.1 |
| 4,446,304 | A | * | 5/1984 | Gaymans et al. | ........... 528/335 |
| 4,945,152 | A | * | 7/1990 | Peerlkamp | .................. 528/335 |
| 5,461,141 | A | | 10/1995 | Sheetz | |

FOREIGN PATENT DOCUMENTS

| EP | 38 094 | 10/1981 |
| EP | 207 539 | 1/1987 |
| EP | 210 511 | 2/1987 |

* cited by examiner

Primary Examiner—N. Edwards
(74) Attorney, Agent, or Firm—Mayer Brown Rowe & Maw LLP

(57) ABSTRACT

The invention relates to a process for the manufacture of homopolyamide-4,6 fibers by melt spinning of homopolyamide-4,6, to fibers and multifilament yarns obtainable by the process and the use thereof for the reinforcement of rubber like in tire cords, V-belts etc. The invention further relates to a novel homopolyamide-4,6, a process for the manufacture thereof and the use of the new homopolyamide-4,6 for the manufacture of fibers, films and injection molded articles. The homopolyamide-4,6 fiber is manufactured by melt spinning of homopolyamide-4,6 having nascent morphology with a melting enthalpy of at least 140 J/g and a main melting temperature between 290 and 305° C.

33 Claims, No Drawings

PROCESS FOR THE MANUFACTURE OF HOMOPOLYAMIDE-4,6 FIBERS

CROSS REFERENCE TO RELATED APPLICATION

This application is the National Phase of International Application PCT/NL02/00441 filed Jul. 5, 2002 which designated the U.S., and that International Application was published under PCT Article 21(2) in English, and further claims the benefit of provisional application Ser. No. 60/303,389, filed Jul. 9, 2001.

The invention relates to a process for the manufacture of homopolyamide-4,6 fibers by melt spinning of homopolyamide-4,6, to fibers and multifilament yarns obtainable by the process and the use thereof for the reinforcement of rubber like in tire cords, V-belts etc. The invention further relates to a novel homopolyamide-4,6, a process for the manufacture thereof and the use of the new homopolyamide-4,6 for the manufacture of fibers, films and injection molded articles.

Polyamide-4,6 was described as early as 1938 (U.S. Pat. No. 2,130,948, Carothers). Polyamide-4,6 is the polycondensation product of the monomers tetramethylene-diamine and adipic acid. Due to the very high melting temperature the production of polyamide-4,6 was very difficult. As late as 1985 a process was invented to produce polyamide-4,6 on a commercially attractive scale as described in EP-A-0207539. Here it is described that polyamide-4,6 can be produced basically by a 2 step process comprising a pre-condensation step followed by a solid state post-condensation step below the melting temperature at temperatures between 225 and 275° C.

As of day one, the use of polyamide-4,6 in fibers appeared very attractive and was actively explored. However, all attempts to make homopolyamide-4,6 fibers of acceptable quality on a significant scale failed. A comprehensive summary of knowledge on polyamide-4,6 up to 1998 is described in the "Becker/Braun Kunststoff-Handbuch Band 3/4, Polyamide, Ed Carl Hanser Verlag 1998, Ch.3, polyamide-4,6 page 549–page 638" (hereafter referred to as the "Handbuch"). In Chapter 3.8.3.1 it is described that the solution to that problem is to copolymerise polyamide-4,6 monomers with about 5% polyamide 6 monomer (caprolactam) to form copolyamide-4,6/6. This copolyamide-4,6/6 is marketed as STANYL® fiber grade by DSM in the Netherlands. It is emphasised that in the numerous publications describing polyamide-4,6 fibers it is implicit that they are made of copolyamide-4,6 described above and not from homopolyamide-4,6. The Handbuch describes that the copolyamide-4,6/6 has a melting temperature of about 290° C., i.e. about 8 degrees below the melting temperature of the homopolyamide-4,6, and that the melting enthalpy and melt viscosity are comparable to polyamide 6 and 66 such that the extrusion of the copolyamide-4,6/6 granules can be done in the same way as for polyamide 6 and 66.

There still is however a long felt desire to improve the quality of the copolyamide-4,6 fiber and to be able to spin homopolyamide-4,6 fibers, also because homopolyamide-4,6 is easier to produce and more readily available. Hence the main object of the invention is to provide for a process for the manufacture of homopolyamide-4,6 fibers.

According to the invention this is achieved in that the homopolyamide-4,6 fiber is manufactured by melt spinning of homopolyamide-4,6 having a nascent morphology with a melting enthalpy of at least 140 J/g and a main melting temperature between 290 and 305° C. (first heating curve measured according to ASTM D3417-97/D3418-97 with DSC at a heating rate of 10° C./min at sample mass of about 3–5 mg taken from a cryogenically ground representative sample of at least about 20 gr).

It was surprisingly found that the novel homopolyamide-4,6 having said properties could be spun to fibers. This is particularly surprising since the melting enthalpy is extremely high, in particular about two times higher than the melting enthalpy of the copolyamide-4,6/6 (73 J/g) reported in the "Handbuch". It is especially surprising that such a high melting enthalpy can occur together with a relatively low melting temperature since it is known that high melting temperature and high melting enthalpy are associated. For example, Gaymans, the inventor of the polyamide-4,6 manufacturing process, describes in the "Journal of polymer sci., Pol. Chem. Edition Vol. 15, 537–545 (1977) a polyamide-4,6 having a melting enthalpy close to 140 J/g and a main melting temperature of 320° C. In another publication by Gaymans ("Journal of polymer sci., Part A: Pol. Chem. Edition Vol. 27, 423–430 (1989)) a polyamide-4,6 is described that has, even at a melting enthalpy well below that according to the invention, a melting temperature at the upper limit of the range according to the invention. The invention hence also relates to a homopolyamide-4,6 having a nascent morphology with a melting enthalpy of at least 140 J/g and a main melting temperature between 290 and 305° C. The inventors believe that the basis for the good spinning processability of the novel homopolyamide-4,6 is in the extremely high crystal perfection and molecular order reflected by the very high melting enthalpy. With nascent morphology is meant that the polyamide-4,6 has never been in the melt during or after the solid-state post condensation.

In the process according to the invention the homopolyamide-4,6 is spun from the melt at a temperature between 10 and 20° C., preferably between 10 and 15° C., above the main melting temperature of the homopolyamide-4,6. This temperature difference is referred to as excess temperature. It is very surprising that homopolyamide-4,6 can be spun at such small excess temperatures because at excess temperatures of only 10 to 20° C. melt memory effects in homopolyamide-4,6 are not erased which is considered detrimental to spinnability. Further the required excess temperature in copolyamide-4,6 is about 25 to 30° C. as described in the example of EP-A-942 0 79. For homopolyamide-4,6 such excess temperatures would be detrimental to the extrusion stability and to the obtained fiber properties. With spinning temperature is meant the highest temperature occurring in the melt in the spinning process. At an excess temperature of at least 10, preferably 15, more preferably 17, most preferably at least 20° C. a more homogeneous melt is obtained resulting in a better spinnability. At an excess temperature of at most 25° C., preferably 20° C. less polymer degradation occurs resulting in a lower viscosity decrease and better fiber properties. Good results were obtained by spinning with a melt-temperature at the exit of the melt-spinning apparatus of between 305 and 315° C., preferably between 310 and 315° C.

In view of obtaining good fiber properties and stable spinning conditions in the process according to the invention the homopolyamide-4,6 has a viscosity number in the range 160–250 ml/g, preferably 180–240, most preferably 205–225 ml/g. The viscosity number of polyamide 4,6 is determined according to ISO 307 on a solution of 0.5 gram of polyamide 4,6 in 100 ml of formic acid (90.0 m/m %, density D20/4 1,2040 g/ml ) at 25° C. All polyamide 4,6 granules are cryogenically ground to particles <2 mm. After grinding the polymer is dried 16 h at 105 C under vacuum.

In the process according to the invention the homopolyamide-4,6 preferably has an average polymer residence time in the extruder of less than 6 minutes, preferably less than 5 minutes, most preferably less than 4.5 minutes. It was surprisingly found that by using the novel nascent polyamide-4,6 a sufficiently homogeneous melt could be obtained even in such very short residence times in the spinning extruder, resulting in stable spinning and good fiber properties. The average polymer residence time in the extruder is defined as the ratio of the total internal volume accessible by polymer (in cc), calculated from the throat of the extruder to the spinneret exit face, divided by the throughput rate (in cc/min). For ease of determination, the internal volume hence includes also the part where the polymer is not yet melted. The actual residence time is hence even significantly shorter, to an extent depending on the exact configuration of the extruder.

It was found that in the process according to the invention, the difference in the viscosity number of the nascent homopolyamide-4,6 and of the polyamide-4,6 in the spun fiber is less than 25%, preferably less than 20%. This is achieved in essentially dry conditions where the water content preferably is below 500, more preferably below 300 ppm. The advantage of a low viscosity drop is a better retention of mechanical properties. This is an excellent achievement in view of the high melting temperature of the polyamide-4,6. Under such conditions very good fibers could be obtained having good mechanical properties as specified below.

The preferred embodiment of the process according to the invention is a process for the manufacture of homopolyamide-4,6 fibers by melt spinning of homopolyamide-4,6 having a nascent morphology with a melting enthalpy of at least 140 J/g and a main melting temperature between 290 and 305° C. and a viscosity number in the range 160–250 ml/g, wherein the polyamide-4,6 is spun at a temperature between 310 and 315° C. with an average polymer residence time in the extruder of less than 5 minutes and wherein the difference in the viscosity number of the nascent homopolyamide-4,6 and of the-fiber spun thereof is less than 25%.

After the spinning the fiber is spun with a take-up speed between 400 and 2000 m/min, preferably between 400 and 1000 m/min. and subsequently drawn in a drawing process preferably comprising at least 2 drawing steps. Drawing can be done in line with spinning in a spin-draw-winding machine or off-line in a separate drawing unit. In view of obtaining good drawability and mechanical properties the drawing process preferably involves a first drawing step with a draw ratio of less than 80% of the total draw ratio, preferably less than 70% of the total draw ratio. The drawing process is preferably executed at a temperature below 240° C., preferably between 180–220° C.

The invention further relates to a homopolyamide-4,6 fiber obtainable by the process described above, wherein the homopolyamide-4,6 in the fiber has a viscosity number in the range 130–200, preferably 140–200, more preferably 165–195, most preferably 175–185 ml/g. With fiber is meant a mono- or multifilament fiber. The fiber has good mechanical properties like a high fatigue resistance, a very low creep elongation, a low shrinkage and a high shrink force, a high elongation at break, and low discoloration. Further the fiber has high temperature resistance and hence a very good retention of mechanical properties at elevated temperatures.

The homopolyamide-4,6 fiber preferably has a TVE being at least 24, preferably at least 25 and more preferably at least 30 and most preferably at least 35 (T is the tenacity in cN/dtex, E is the elongation at break in % measured according to ASTM D885-98 method at 500 mm sample length and 100%/min drawing speed).

In particular the invention relates to a multifilament yarn comprising homopolyamide-4,6 fibers according to the invention wherein the yarn has a titer of at least 800, preferably 1000, more preferably at least 1200 dtex. It was found that multifilament yarns having a high titer, in particular above 800, have better mechanical properties than yarns with a lower titer produced in the same circumstances. It was found that the filament titer is preferably below 10, more preferably below 8 and most preferably below 6 dtex.

The invention also relates to a homopolyamide-4,6 having a nascent morphology with a melting enthalpy of at least 140 J/g and a main melting temperature between 290 and 305° C. (measured as described above). Preferably the melting enthalpy is at least 145, more preferably at least 150 and most preferable at least 155 J/g. The main melting temperature preferably is between 290 and 300. More preferably the melting enthalpy is even at least 160 J/g and the main melting temperature preferably is between 290 and 300° C. As explained above the homopolyamide-4,6 according to the invention surprisingly has excellent processability for fibers, films and extrudates.

The invention also relates to a process for the manufacture of a homopolyamide-4,6 according to the invention. In EP-A-0207539 it is described that polyamide-4,6 can be produced basically by a 2 step process comprising a pre-condensation step followed by a solid state post-condensation step (hereafter referred to as SSPC step) below the melting temperature at temperatures between 225 and 275° C. In all examples the SSPC temperature is however at 260° C. No melting enthalpies or spinning properties are mentioned. In Polymer 1985 Vol. 26, September, Page 1582–1588 it is described that polyamide-4,6 produced at SSPC temperature of 260° C. has a melting enthalpy of only 138 J/g and a high melting temperature of 305° C. In the publications of Gaymans referred to above SSPC temperatures are mentioned between 280 and 305° C. (Gaymans 1977). High melting enthalpies occur only with very high melting temperatures. The problem of the known process is that the homopolyamide-4,6 obtained does not have good spinning properties. This problem was, according to the invention, solved in that the solid-state post condensation of homopolyamide-4,6 prepolymer is done at a temperature below 250° C.

It is surprising that at such a low solid-state post condensation (SSPC) temperature a homopolyamide-4,6 can be produced having good spinnability. In particular it is surprising that such a high melting enthalpy can be achieved in combination with a relatively low melting temperature. Preferably the SSPC temperature is below 245° C. in view of obtaining a high melting enthalpy and low melting temperatures giving good spinning properties.

In a particularly preferred embodiment the SSPC temperature is below 240° C., more preferably below 235° C. most preferably below 230° C. It was found that at a SSPC temperature below 240° C. the polyamide-4,6 always has essentially no peaks or shoulders at the high temperature side of the main melting peak even at prolonged SSPC times and even in case there may be considerable spread in residence time in the SSPC reactor. This is particularly the case for residence times required to achieve a viscosity number between 160 and 260. Due to a SSPC below 240° C., preferably below 235° C. at least 80%, in particular more than 90% and usually essentially 100% of the area of the melting peak of the obtained nascent homopolyamide-4,6 is below a temperature of 305° C.

The prepolymer can be made in the known way as described in EP-A-0207539 by heating 1,4-diaminobutane and adipic acid at a temperature between 150 to 310° C., preferably between 180 and 240° C. for a time sufficient to reach the desired molecular weight (or viscosity number). Preferably the prepolymer has a viscosity number between 3 and 90 ml/g and is solid-state post condensated to a viscosity number between 160–250 ml/g. It is further preferred that also the homopolyamide-4,6 prepolymer is prepared at temperatures below 250, preferably below 240° C. in view of retaining optimum nascent morphology and maximum spinnability. The viscosity number of polyamide-4,6 prepolymer with viscosity numbers below 15 is determined according to ISO 307 on a solution of 5 gram of prepolymer in 100 ml of formic acid (90.0 m/m %) at 25° C., the sample being taken from at least 20 gr cryo-ground material.

Preferably, in the process according to the invention, the solid-state post condensation is performed in a water containing gas atmosphere having a dew temperature at atmospheric pressure between 5 and 100° C. At dew temperature above 5° C. less discoloration occurs. The dew temperature may be chosen such that the yellowness index is lower than 20. At a dew temperature below 90° C. preferably below 80° C., more preferably below 70° C., it was found that the main melting temperature of the obtained homopolyamide-4,6 is lower. After SSPC in the presence of water vapor, drying at dry conditions may be performed to reduce the water content of the polyamide-4,6.

The invention further relates to homopolyamide-4,6 obtainable by the process according to any one of the process embodiments described above, in particular homopolyamide-4,6 obtainable by the process, wherein the solid state polycondensation is performed at a temperature below 240° C., preferably below 235° C. It is observed that in those conditions the homopolyamide-4,6 has an essentially symmetric melting curve, in particular having essentially no peaks or shoulders at the high temperature side of the main melting peak and having at least 80%, preferably 90% of the area of the melting peak below a temperature of 305° C.

U.S. Pat. No. 5,461,141 describes post condensation at temperatures between 195 and 235° C. of polyamide-4,6 granulate. This however relates to increasing molecular weight of fully polymerized resin granulate having a molecular weight of above about 15000, i.e. a viscosity number of above about 240 in absolute dry atmosphere. Similarly DE 3526931 describes the dry post condensation at 250° C. of polyamide-4,6 that has been prepolymerised in the melt at temperatures between 280 and 320° C. These references do not disclose polyamide-4,6 having a nascent morphology with the required melting characteristics according to the invention nor the suitability and use thereof in fiber spinning.

The many advantages of the polyamide-4,6 according to the invention as described above are not only manifest in fiber spinning but also in other molding processes, in particular in those application where the material is essentially unfilled like in films and extrusion molding. The invention hence further relates to the use of the homopolyamide-4,6 according to the invention for the manufacture of fibers, films, extrusion and injection molded articles.

The invention is further illustrated by the examples described below.

Preparation of the Prepolymer

Diaminobutane (346 g), adipic acid (561 g) and water (72 g) were mixed and heated in a closed and inertised autoclave to provide a homogeneous solution. The polyamide salt was heated at a temperature of 205° C. for 30 minutes. Subsequently the reaction product was released into an inertised atmospheric vessel, allowing water to escape by means of venting. The product was pelletised by pressing the powder at a temperature of 90° C. through a perforated metal plate with hole diameters of 3 mm. The white prepolymer pellets had a VN of 12.4 ml/g and a number average molecular weight of 814 g/mol as determined from the sum of the amino, carboxylic and pyrrolidine end groups. The so obtained prepolymer material was used as a starting material for the solid-state post condensation processes described below. The obtained samples were analyzed by DSC as described above to determine the melting temperature and the melting enthalpy. The viscosity number also was determined as described above.

The obtained homopolyamide-4,6 materials were used for spin trials to assess the spinnability. The polymers are dried to a moisture content of 200 ppm and transferred under a dry nitrogen atmosphere into the hopper of the extruder. The polymer is melted using a single-screw extruder with an 18 mm screw diameter. The spinhead containing the spin pump and spin pack are directly mounted to the extruder head. The polymer melt is then passed through a spinning pack having a metal filter fabric with fine holes of a diameter of 10 micrometer, and extruded from a spinneret having orifices with a diameter of 0.5 mm. The spinning temperature of the melt at the spinhead was chosen between 310 and 315° C., the a total residence time in the extruder was chosen between 4 and 6 minutes. The conditions in the mentioned ranges were varied to find optimum spinnability conditions. The as-extruded filaments are passed through a hot cylinder of 30 cm in length, which is located immediately below the spinneret. The temperature of the inert atmosphere inside the hot cylinder was adjusted to 300° C. The filaments traveling through the hot cylinder were passed through a cross-flow quench cabinet, located beneath the hot cylinder, where the filaments are quenched. In the quench chamber, cold air of temperature 20° C. was blown against the filaments in the direction perpendicular to the filaments The as-spun yarns are drawn to various draw ratios in a separate, multi-stage drawing process using an Erdmann "Drawmod" drawframe consisting of a pretension roll, 4 heated godet—idler pairs and a winder. The pretension and feed rolls are not heated and the first drawing roll is maintained at a temperature of 120° C. The temperature of the second drawing roll is adjusted at values between 180 and 240° C. The speed of the rolls is selected in such a way that an overall draw ratio between 3.0 and 6.0 is achieved. The drawn yarn is subsequently relaxed using a non-heated godet and wound onto a bobbin.

The spinnability was qualitatively assessed as follows:

The qualification of no acceptable spinnability ("−"in Table 1) was given when: Undrawn Yarn take-up is not possible or when the extrudate from the spinneret is heavily degraded, low in viscosity, and/or discolored or when frequent yarn breakage occurs during spinning.

The qualification of poor spinnability ("+/−"in Table 1) was given when: Undrawn yarn take up is possible but yarn breaks occur during spinning or filament breaks set in already at low draw ratio's or when the drawn yarn TvE does not exceed the value of 24.

The qualification of good spinnability ("+"in Table 1) was given when: Stable undrawn yarn production is possible. Higher draw ratios are possible. Drawn yarns have TvE exceeding 24.

Comparative Experiment A

The prepolymer was post condensed at a temperature of 260° C. in an atmosphere of nitrogen and steam with a dew temperature of 72° C. for a period of 29 hours to obtain a product with a VN of 270 ml/g. The properties of the obtained sample CEA are listed in Table 1.

Comparative Experiment B

The prepolymer was prepared as described above. The prepolymer was post condensed at a temperature of 230° C. in an atmosphere of nitrogen and steam with a dew temperature of 72° C. for a period of 23 hours. This product was melt extruded at a temperature of 320° C. with a residence time in the melt of 1 minute. The resulting strand was granulated. The granulated polymer so obtained had a viscosity number of 150 ml/g. The melt granulates were post condensed in the solid state at a temperature of 260° C. in an atmosphere of nitrogen for a period of 15 hours to obtain a product with a VN of 230 ml/g. The properties of the obtained sample CEB are listed in Table 1.

Comparative Experiment C

The prepolymer was post condensed at a temperature of 260° C. in an atmosphere of nitrogen and steam with a dew temperature of 72° C. for a period of 4 hours to obtain a product with a VN of 160 ml/g. The properties of the obtained sample CEC are listed in Table 1.

EXAMPLE 1

The prepolymer was post condensed at a temperature of 250° C. in a static bed in an atmosphere of nitrogen and steam with a dew temperature of 72° C. for a period of 48 hours to obtain a product with a VN of 250 ml/g. The properties of the obtained sample E1 are listed in Table 1.

EXAMPLE 2

The prepolymer was post condensed at a temperature of 242° C. in a static bed in an atmosphere of nitrogen and steam with a dew temperature of 72° C. for a period of 24 hours to obtain a product with a VN of 212 ml/g. The properties of the obtained sample E2 are listed in Table 1.

EXAMPLE 3

The prepolymer was post condensed at a temperature of 230° C. in a static bed in an atmosphere of nitrogen and steam with a dew temperature of 72° C. for a period of 48 hours to obtain a product with a VN of 200 ml/g. The properties of the obtained sample E3 are listed in Table 1.

EXAMPLE 4

The prepolymer was post condensed at a temperature of 230° C. in a static bed in an atmosphere of steam (dew temperature 100° C.) for a period of 59 hours to obtain a product with a VN of 196 ml/g. The properties of the obtained sample E4 are listed in Table 1.

EXAMPLE 5

The prepolymer was post condensed at a temperature of 222° C. in a static bed in an atmosphere of nitrogen and steam with a dew temperature of 54° C. for a period of 72 hours to obtain a product with a VN of 204 ml/g. The properties of the obtained sample E5 are listed in Table 1.

TABLE 1

| Exp. | SSPC T (° C.) | Dew T (° C.) | VN (ml/g) | Tm1 (° C.) | Hm1 (J/g) | Spinnability |
|---|---|---|---|---|---|---|
| CEA | 260 | 72 | 270 | 309 | 175 | − |
| CEB | 260 | Nitrogen | 230 | 308 | 136 | − |
| CEC | 260 | 72 | 160 | 293 | 135 | − |
| E1 | 250 | 72 | 250 | 303 | 164 | +/− |
| E2 | 242 | 72 | 212 | 297 | 160 | + |
| E3 | 230 | 72 | 200 | 295 | 154 | + |
| E4 | 230 | 100 | 196 | 296 | 165 | + |
| E5 | 222 | 54 | 204 | 294 | 155 | + |

What is claimed is:

1. A process for the manufacture of homopolyamide-4,6 fibers by melt spinning of homopolyamide-4,6 having a nascent morphology with a melting enthalpy of at least 140 J/g and a main melting temperature between 290 and 305° C.

2. Process according to claim 1, wherein the homopolyamide-4,6 is spun from the melt at a temperature between 10 and 20° C. above the main melting temperature of the homopolyamide-4,6.

3. Process according to claim 1, wherein the polymer melt-temperature at the exit of the melt-spinning apparatus is between 305 and 320° C.

4. Process according to claim 1, wherein the homopolyamide-4,6 has a viscosity number in the range 160–250 ml/g.

5. Process according to claim 1, wherein the homopolyamide-4,6 has an average polymer residence time in the extruder of less than 6 minutes.

6. Process according to claim 1, wherein the difference in the viscosity number of the nascent homopolyamide-4,6 and of the fiber spun thereof is less than 25%.

7. A process according to claim 1, wherein the fiber is spun with a take-up speed between 400 and 2000 m/min.

8. A process according to claim 1, wherein the spun fiber is drawn in a drawing process comprising at least 2 drawing steps.

9. A process according to claim 8, wherein the drawing process involves a first drawing step with a draw ratio of less than 80% of the total draw ratio.

10. A process according to claim 8, wherein the drawing process is executed at a temperature below 240° C.

11. A homopolyamide-4,6 fiber obtainable by the process according to claim 1, wherein the homopolyamide-4,6 in the fiber has a viscosity number in the range 130–200.

12. A homopolyamide-4,6 fiber according to claim 11, having a TvE being at least 24, wherein T is the tenacity in the cN/dtex and E is the elongation at break in % measured according to ASTM-D885-98 at 500 mm sample length and 100%/min drawing speed.

13. A multifilament yarn comprising homopolyamide-4,6 fibers according to claim 11, wherein the yarn has a titer of at least 800.

14. Homopolyamide-4,6 having a nascent morphology with a melting enthalpy of at least 140 J/g, and a main melting temperature between 290 and 305° C.

15. Process for the manufacture of a homopolyamide-4,6 according to claim 14, comprising solid-state post condensation of homopolyamide-4,6 prepolymer at a temperature below 250° C.

16. Process according to claim 15, wherein the temperature is below 240° C.

17. Process according to claim 15, wherein the solid state post condensation is performed in a water containing gas atmosphere having a dew temperature at atmospheric pressure between 5 and 100° C.

18. Process according to claim 15, wherein the prepolymer has a viscosity number between 3 and 90 and is solid state post condensated to a viscosity number between 160–250 ml/g.

19. Process according to claim 15, wherein the homopolyamide-4,6 prepolymer is prepared at a temperature below 250° C.

20. Homopolyamide-4,6 obtainable by the process according to claim 15.

21. Homopolyamide-4,6 obtainable by the process according to claim 15, wherein the solid state polycondensation is performed at a temperature below 240° C.

22. Homopolyamide according to claim 21 wherein at least 80% of the area of the melting peak is below a temperature of 305 ° C.

23. Homopolyamide-4,6 according to claim 14, having a nascent morphology with a melting enthalpy of at least 150 J/g.

24. Process according to claim 15, wherein the homopolyamide-4,6 prepolymer is prepared at a temperature below 240° C.

25. Fiber, film, extrusion for injection molded article comprising the homopolyamide-4,6 according to claim 14.

26. Fiber, film, extrusion for injection molded article comprising the homopolyamide-4,6 according to claim 20.

27. Fiber, film, extrusion for injection molded article comprising the homopolyamide-4,6 according to claim 21.

28. An article in the form of an air bag, a serving thread or abrasion resistant fabric, wherein said article comprises a homopolyamide-4,6 fiber according to claim 11.

29. An article in the form of an air bag, a serving thread or abrasion resistant fabric, wherein said article comprises a homopolyamide-4,6 fiber according to claim 12.

30. An article in the form of an air bag, a serving thread or abrasion resistant fabric, wherein said article comprises a multifilament yarn according to claim 13.

31. A rubber-reinforced article, such as V-belts, tire cap plies, airplane tire carcasses or air springs, wherein such article is reinforced with a homopolyamide-4,6 fiber according to claim 11.

32. A rubber-reinforced article, such as V-belts, tire cap plies, airplane tire carcasses or air springs, wherein such article is reinforced with a homopolyamide-4,6 fiber according to claim 12.

33. A rubber-reinforced article, such as V-belts, tire cap plies, airplane tire carcasses or air springs, wherein such article is reinforced with a multifilament yarn according to claim 13.

\* \* \* \* \*